United States Patent [19]

Wiederstein

[11] Patent Number: 4,586,124
[45] Date of Patent: Apr. 29, 1986

[54] DEVICE FOR REGULATING LINEAR MOTION

[75] Inventor: Gerd-Walter Wiederstein, Gummersbach, Fed. Rep. of Germany

[73] Assignee: Starkstrom Gummersbach GmbH, Marienheide, Fed. Rep. of Germany

[21] Appl. No.: 564,229

[22] Filed: Dec. 21, 1983

[30] Foreign Application Priority Data

Dec. 31, 1982 [EP] European Pat. Off. ........ 82112131.6

[51] Int. Cl.$^4$ ................... G05B 19/18; G05B 11/18; G05B 11/32; G06F 15/46
[52] U.S. Cl. ................... 364/167; 364/474; 364/170; 318/592; 318/601; 318/625
[58] Field of Search ............... 364/167, 168, 169, 170, 364/474, 475; 318/592, 593, 594, 595, 599, 601, 603, 625, 640

[56] References Cited

U.S. PATENT DOCUMENTS

| | | | |
|---|---|---|---|
| 4,099,103 | 7/1978 | Seeger et al. | 318/625 X |
| 4,242,621 | 12/1980 | Spaulding | 318/601 |
| 4,294,531 | 10/1981 | Shenk | 318/601 |
| 4,312,033 | 1/1982 | Sweeney et al. | 364/167 |
| 4,371,941 | 2/1983 | Gordiski et al. | 364/475 |
| 4,404,626 | 9/1983 | Aoyama | 364/167 X |
| 4,405,884 | 9/1983 | Weber | 318/625 X |
| 4,433,275 | 2/1984 | Imazeki et al. | 318/625 X |
| 4,439,825 | 3/1984 | Donner | 364/167 |
| 4,456,863 | 6/1984 | Matusek | 318/572 X |
| 4,490,796 | 12/1984 | Bigbie et al. | 318/599 X |

Primary Examiner—Jerry Smith
Assistant Examiner—Jon D. Grossman
Attorney, Agent, or Firm—Michael J. Striker

[57] ABSTRACT

Disclosed is a device for regulating motion of a drive component moving along or about a follower axis in response to linear motion of a master drive driven along or about a guiding axis x. The device includes two sensors for sensing the actual displacement along or about the two axes to produce two pairs of phase-shifted timing signals defining the actual displacements about respective axes. The timing signals are applied to a regulating difference generator which includes a forward-/backward counter whose output delivers the regulating difference signal. The output of the counter is coupled to the follower drive. A desired displacement signal for the guiding axis is directly applied to the master drive.

12 Claims, 4 Drawing Figures

DEVICE FOR REGULATING LINEAR MOTION

BACKGROUND OF THE INVENTION

The invention relates to a device for regulating linear motion of a driven component part, particularly of a driven part of a machine tool, along at least two correlated paths corresponding to axes x and y, whereby the motion along respective axes is performed by separate drive units. The term "component part" in this context is meant in quite a general sense, that is, the component part can be for example an exactly guided tool such as a milling cutter or a grinding disk or an accurately guided part of a measuring instrument. Also, the term "axes" is to be interpreted in its broadest meaning, which may denote both physical rotary axles arranged at an angle one to another as well as orthogonal-coordinate axes or axes correlated at another angle, along which a linear function of the component part is generated.

In control technology a frequently occurring problem is how to perform a linear function $$S_y = M \cdot S_x \qquad \text{(Equation 1)}$$

along the axes x and y. In this equation it is assumed that the x-axis is the master or leading axis and the y-axis is the follower axis. In Equation 1, $S_x$ denotes the track predetermined by the master axis x and M is a real constant which is predetermined by the displacement process to be made. The path along the y-axis is to be regulated in position in such a manner that the Equation 1 is always fulfilled.

In practice, several proposals have already been made in order to realize such a linear motion regulation by means of regulating circuits. Such prior-art proposals, however, require very high expenditures for the actual regulating circuit, whereby the regulating process itself is inaccurate and too slow for practical use.

SUMMARY OF THE INVENTION

It is therefore a general object of the present invention to overcome the above mentioned disadvantages.

More particularly, it is an object of the invention to provide an improved device for regulating linear motions of the aforedescribed kind which enables to achieve a high precision of the regulating process.

Another object of this invention is to provide such an improved device which requires less circuit units and is less expensive to manufacture.

In keeping with these objects and others which will become apparent hereafter, one feature of the invention resides, in a device of the aforedescribed kind, in a combination which comprises at least two drive units for displacing the component part along respective x- and y-axes, one of the drives being a master drive and the other a follower drive, mechanically coupled sensors for generating timing signals corresponding to the actual displacement of respective drive units, a counter coupled to the actual displacement sensors to determine from the timing signals a regulating difference signal from which a proper sign is determined, a position regulator connected between the counter and the drive units to regulate the follower drives in response to movements of the master drive.

The substantial advantage of this invention resides in the fact that the regulating difference and its correct sign are determined by means of a counter and a relatively simple hardware, so that the regulating difference can be directly applied to the drive on the guided axis.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

It is essential for this invention to determine the regulating difference $$x_{dy} = M \cdot S_x - S_y \qquad \text{(Equation 2)}$$

The determined regulating difference is directly applied to a digital position regulator or via a D/A-converter to an analog position regulator for regulating the linear movement along the follower y-axis, as it will be explained in detail below in connection with FIGS. 1 and 3. The circuit for determining the regulating difference is assembled exclusively of electronic digital modules constructed by TTL and CMOS technology.

Figure 1:
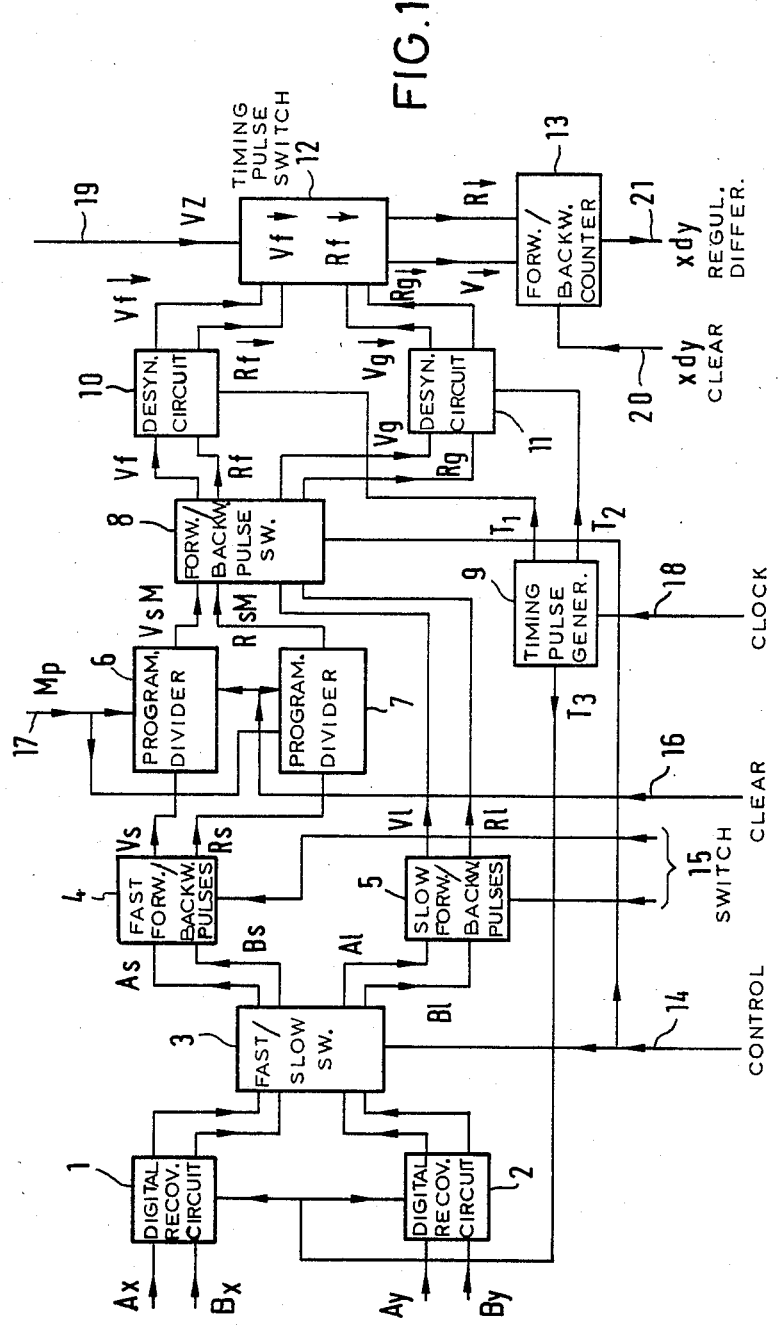
FIG. 1 is a block circuit diagram of the device of this invention generating a regulating difference value.

Referring to FIG. 1, two timing pulses $A_x$, $B_x$ and $A_y$, $B_y$ are applied to corresponding inputs of digital recovering circuits 1 and 2. The shape of the timing pulses A and B is illustrated in the time plot of FIG. 2. The two phase-shifted timing pulses are delivered for example by incremental actual displacement sensors which are mechanically coupled to the tracks or axes x and y. Specifically, an incremental actual displacement sensor is assigned to the x-axis and the other sensor to the y-axis. Each pair of phase-shifted timing pulses $A_x$, $B_x$ and $A_y$, $B_y$ is subjected to a digital recovery in the circuits 1 and 2. The restoration or recovery in the modules 1 and 2 is made by a shift register and corresponding auxiliary logic circuits, so that the recovery time is determined by the length of the shift regsister and by the timing of the shifting operations. The modules for performing these functions are integrated circuits of known construction. The purpose of these integrating circuits is to eliminate interfering impulses whose duration is smaller than the recovery time. The recovery time also determines the minimum time period between two flanks of the output pulses at the units 1 and 2.

The outputs of the units 1 and 2 are connected to corresponding inputs of a device 3 for switching over fast/slow timing pulses. Corresponding outputs of device 3 are connected to units 4 and 5. The unit 4 serves for generation of fast leading and trailing pulses, whereas the unit 5 serves for the generation of slow leading and trailing timing pulses for the guided or follower track. When the desired timing pulse ratio $M_{p1}$ between the follower and master axes is greater than 1, then the leading and trailing timing pulses are applied by the switching device 3 to the unit 5 for generating slow leading and trailing pulses, whereas when the ratio is less than 1, the timing pulses are switched over to the unit 4 for generating fast leading and trailing pulses. The switchover from fast to slow leading pulses is controlled by a control signal applied to the device 3 via conduit 14. The output signal from the switch-over device 3 is applied to the units 4 and 5 via conduits $A_s$, $B_s$ and $A_1$, $B_1$.

Figure 2:
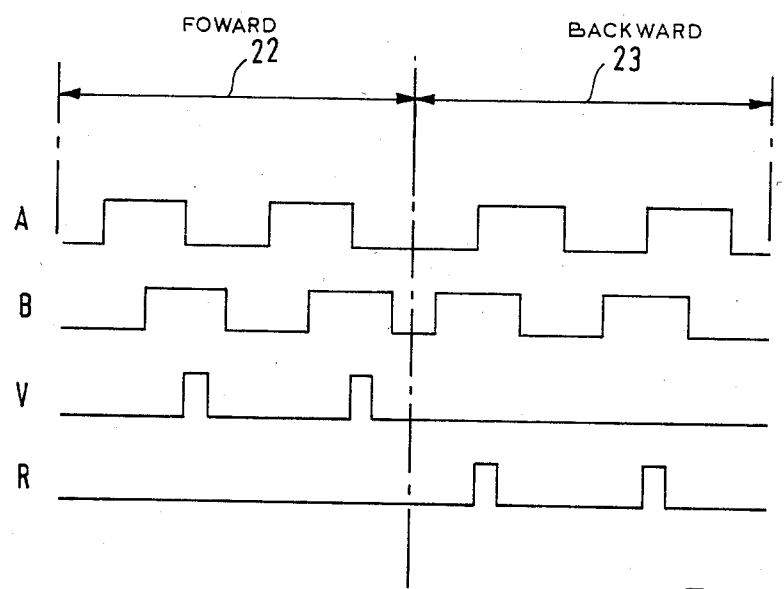
FIG. 2 is a time plot of two phase-shifted timing signals generated by the actual displacement sensors and a time plot of forward and backward signals derived from the timing signals.

Units 4 and 5 contain monostable multivibrators which produce, in dependence upon the rising or falling flanks of the restored two-phase timing signals, the leading timing signals $V_s$, $V_1$ and trailing timing signals $R_s$, $R_1$. The shape of the leading and trailing timing pulses V, R is also illustrated in FIG. 2.

The slow leading and trailing timing pulses $V_1$, $R_1$ from the output of unit 5 are applied directly to a switching module 8, which switches over leading or trailing timing pulses. It will be seen from FIG. 1 that the fast timing pulses $V_s$, $R_s$ are also applied to the switchover module 8 via programmable dividers 6 and 7. Conduits 15, leading to control inputs of modules 4 and 5 for generating fast and slow leading and trailing pulses, feed blocking pulses to respective modules 4 and 5 so that, in dependence on the presence or absence of a signal in the conduit 15, the generation of the fast or slow leading and trailing pulses $V_s$, $R_s$ or $V_1$, $R_1$ is either released or suppressed.

The programmable dividers 6, 7 include cascaded digital modules, preferably BCD- or binary dividers. A time multiplier signal $M_p$ is connected via conduit 17 to respective programmable dividers 6 and 7. The number of digits of the applied pulse multiplier signal $M_p$ is determined by the required accuracy and determines in turn the number of cascaded modules. The pulse multiplying signal $M_p$ must be transferred in total. The sign must be applied separately from the switchover of timing pulses $V_f\downarrow$, $R_f\downarrow$. The time pulse multiplier signal $M_p$ is always less than or equal to 1. It is dimensioned such that the aforementioned Equation 1 converts into the following Equations 3 or 4, depending on the sign of the pulse multiplier signal.

$$(\Sigma PV_y = \Sigma PR_y) = \pm[i\, M_{p1}\cdot\Sigma PV_x] \pm [M_{p1}\cdot\Sigma PR_x] \quad \text{(Equation 3)}$$

$$[M_{p2}\cdot\Sigma PV_y] - [M_{p2}\cdot\Sigma PR_y] = \pm(\Sigma PV_x - \Sigma PR_x) \quad \text{(Equation 4)}$$

wherein
$\Sigma PV_{x,y}$ = the sum of all leading pulses for the x- or y-axis
$\Sigma PR_{x,y}$ = the sum of all trailing pulses for the x- or y-axis
$M_{p1}$ = the pulse multiplier following/leading = desired timing pulse ratio between follower/master axis (in total)
$M_{p2} = M_{p2} = 1/M_{p1}$
$[m]$ = the largest integer $\leq m$, or the smallest integer $\geq m$, where m is an arbitrary real number which is valid for both values and depends on the preset pulse multiplier signal $M_p$ and the sum of timing pulses applied in the two programmable dividers. The dividers also perform the rounding off of the digits.

The above equation 3 is realized when the master axis is the faster one. Equation 4 is realized when the follower axis is the faster one. According to the actual case, the pulse multiplier signal applied to the programmable dividers is $M_p = M_{p1}$ or $= M_{p2}$.

At the output of the programmable dividers, the leading and trailing pulses $V_{SM}$ and $R_{SM}$ are delivered. The following equations are valid:

$$\Sigma PV_{SM} = [M_p \cdot \Sigma PV_s] \quad \text{(Equation 5)}$$

$$\Sigma PR_{SM} = [M_p \cdot \Sigma PR_s] \quad \text{(Equation 6)}$$

wherein
$\Sigma PA$ = the sum of all pulses of the timing signal A
$[m]^*$ = the greater integer $\leq m$, or the smallest integer $\geq m$.

Which of the two values is applicable depends on the preset $M_p$ and on the sum of impulses applied in the two dividers. The dividers make a corresponding rounding off.

A data selector cooperates with the module 8 for switching over leading/follower timing pulses. The data selector is controlled by control signals from conduit 14, which is also applied to the fast/slow switching module 3. The switchover is carried out such that the timing pulses $V_{SM}$, $R_{SM}$ from the output of the programmable dividers 6, 7 and the pulses $V_1$, $R_1$ from the output of the module 5 cause the timing pulses of the leading axes to reach the outputs $V_f$, $R_f$ and the timing pulses of the follower axes to reach the outputs $V_g$, $R_g$ of the module 8. The subscript f means leading, and the subscript g means guided.

The outputs $V_f$, $R_f$ are connected to a module 10 for desynchronizing and generating leading pulses, and the outputs $V_g$, $R_g$ are connected to a further module 11 for desynchronizing and generating follower pulses. The modules 10 and 11 include D-flip-flops triggered by flanks of the phase-shifted clock pulses $T_1$, $T_2$ from a clock pulse generator 9. In this manner, it is achieved that the alternation of flanks at the outputs of the flip-flops, which are assigned to different axes, do not occur simultaneously. A simultaneous changeover of the flanks at the D-flip-flops pertaining to one axis is prevented by the digital recovery process.

For the actual operation, the following conditions must be maintained: The duration of a period of a recovery cycle must be less than $\frac{1}{4}$ of the period of the incoming two-phase timing pulses at their maximum frequency. The recovery time must be less than $\frac{1}{2}$ of the period of the two-phase timing pulses at their maximum frequency. The duration of timing pulses $V_f$, $R_f$ and $V_1$, $R_1$ must be less than or equal to the minimum recovery time. The duration of the period of the clock pulses $T_1$, $T_2$ must be less than the duration of the timing pulses $V_f$, $R_f$ and $V_1$, $R_1$. The duration of the subsequently generated pulses $V_f\downarrow$, $R_f\downarrow$ and $V_g\downarrow$, $R_g\downarrow$ must be less than the minimum time between the triggering flanks of clock signals $T_1$ and $T_2$. The outputs of the D-flip-flops are connected to a circuit which produces from the rising flanks a short low pulse. In this manner, the timing pulses $V_f\downarrow$, $R_f\downarrow$ and $V_g\downarrow$, $R_g\downarrow$ are generated.

The modules 10 and 11 for desynchronization are connected to a further module 12 for the switchover of timing pulses, which in turn is connected to a sign-pulse multiplier VZ by conduit 19. The outputs $V\downarrow$, $R\downarrow$ of the timing pulse switch 12 are connected to forward-backward counter 13, whose output delivers the regulating difference signal xdy.

In response to the sign-pulse multiplier VZ, a switching network performs a switchover according to a table given below and produces thus the signals $V\downarrow$, $R\downarrow$.

TABLE

| VZ | $V\downarrow$ | $R\downarrow$ |
|---|---|---|
| 0 | $R_g\downarrow \wedge V_f\downarrow$ | $V_g\downarrow \wedge R_f\downarrow$ |
| 1 | $R_g\downarrow \wedge R_f\downarrow$ | $V_g\downarrow \wedge V_f\downarrow$ |

VZ = 1 neg. sign.
VZ = 0 pos. sign

The input for forward counting of counter 13 is connected to the signal $V\downarrow$, and the backward counting input is connected to the signal $R\downarrow$. The counting result ZE is in the form of a binary number. In order to evaluate this counting result, two conditions (a) and (b), which will be explained below, are to be distinguished. The following equation is always applicable:

$$ZE = \Sigma PV\downarrow - \Sigma PR\downarrow \qquad \text{(Equation 7)}$$

At VZ=0 (positive sign), the following relationships apply:

$$ZE\Big|_{VZ=0} = \Sigma PR_g\downarrow + \Sigma PV_f\downarrow - \Sigma PV_g\downarrow - \Sigma PR_f\downarrow \qquad \text{(Equation 8)}$$

$$= (\Sigma PR_g\downarrow - \Sigma PV_g\downarrow) + (\Sigma PV_f\downarrow - \Sigma PR_f\downarrow)$$

$$= (\Sigma PV_f\downarrow - \Sigma PR_f\downarrow) - (\Sigma PV_g\downarrow - \Sigma PR_g\downarrow)$$

At VZ=1 (negative sign), the following relationship applies:

$$ZE\Big|_{VZ=1} = \Sigma PR_g\downarrow + \Sigma PR_f\downarrow - \Sigma PV_g\downarrow - \Sigma PV_f\downarrow \qquad \text{(Equation 9)}$$

$$= (\Sigma PR_f\downarrow - \Sigma PV_f\downarrow) - (\Sigma PV_g\downarrow - \Sigma PR_g\downarrow)$$

At this point, it is necessary to distinguish the aforementioned two conditions:

Case (a):

If the leading axis is faster, then by combining Equations 8 and 9 with Equations 5 and 6, there results:

$$ZE_a|_{VZ=0} = ([M_{p1}\cdot\Sigma PV_x] - [M_{p1}\cdot\Sigma PR_x]) - (\Sigma PV_y - \Sigma PR_y) \qquad \text{(Equation 10)}$$

$$ZE_a|_{VZ=1} = ([M_{p1}\cdot\Sigma PR_x] - [M_{p1}\cdot\Sigma PV_x]) - (\Sigma PV_y - \Sigma PR_y) \qquad \text{(Equation 11)}$$

wherein in case (a)

$V_x = V_s;\ R_x = R_s$ $V_y = V_1;\ R_y = R_1$

From Equations 10 and 11, it is evident that in the counter 13 a pulse count corresponding to an approximate regulating difference having correct sign is obtained. The following consideration will show how accurately the counting result corresponds to the real regulating difference. Without rounding-off errors in the two dividers, the desired or nominal value would be preset with the accuracy of ±1 pulse. Assuming that each of the two dividers produces a maximum rounding-off error of ±1 (which in fact is smaller), then it follows that the nominal value is preset with an accuracy of ±3 pulses. The actual value is generated with an accuracy of ±1 pulse. Hence, the following equation applies:

$$(ZE_a - 4) \leq x_{dyp} \leq (ZE_a + 4) \qquad \text{(Equation A)}$$

From the Equation A it follows that in the case (a) the guided axis or track can be positioned by a digital regulator with an accuracy of ±4 pulses.

Case (b):

If the guided axis is faster, then by combining Equations 8 and 9 with Equations 5 and 6, there results:

$$ZE_b|_{VZ=0} = (\Sigma PV_x - \Sigma PR_x) - ([M_{p2}\cdot\Sigma PV_y] - [M_{p2}\cdot\Sigma PR_y]) \qquad \text{(Equation 12)}$$

$$ZE_b|_{VZ=1} = (\Sigma PR_x - \Sigma PV_x) - ([M_{p2}\cdot\Sigma PV_y] - [M_{p2}\cdot\Sigma PR_y]) \qquad \text{(Equation 13)}$$

wherein in case (b)

$V_x = V_1;\ R_x = R_1$ $V_y = V_s;\ R_y = R_s$

From Equations 12 and 13 it is evident that in this case the counting result is not an approximate regulating difference. By a consideration similar to that in the preceding case (a), it will be found that:

$$(\lfloor ZE_b\cdot M_{p1}\rfloor\ (*) - 4\lceil M_{p1}\rceil\ (*)) \leq x_{dyp} \leq (\lceil ZE_b\cdot M_{p1}\rceil + 4\lceil M_{p1}\rceil) \qquad \text{(Equation B)}$$

This means that in the case (b) the guided axis can be positioned only with an accuracy of $\pm 4\lceil M_{p1}\rceil$ pulses, wherein $M_{p1} > 1$.

(*)

$\lfloor m\rfloor$ = the largest integer $\leq m$ $\lceil m\rceil$ = the smallest integer $\geq m$ Since in case (b) the pulses of the guided axis are subdivided, the regulating path of the y-axis undergoes a change which has to be considered in the design of the regulator. The case (b) can be obviated when the pulses pertaining to the guiding axis are suitably multiplied when $M_{p1} < 1$. Accordingly, the condition for the case (a) is created.

As mentioned before, at the output 21 of the forward-backward counter 13 a regulating difference xdy is delivered. A reverted signal Clear xdy is fed back to the clear input of the counter 13 via conduit 20. For the sake of completeness it will be also mentioned that via conduit 16 a Clear signal is applied to the dividers 6 and 7, and the timing pulse generator 9 receives input clock pulses via conduit 18.

In FIG. 2, arrow 22 indicates the range of leading or forward pulses and array 23 denotes the range of trailing or backwards pulses.

Figure 3:
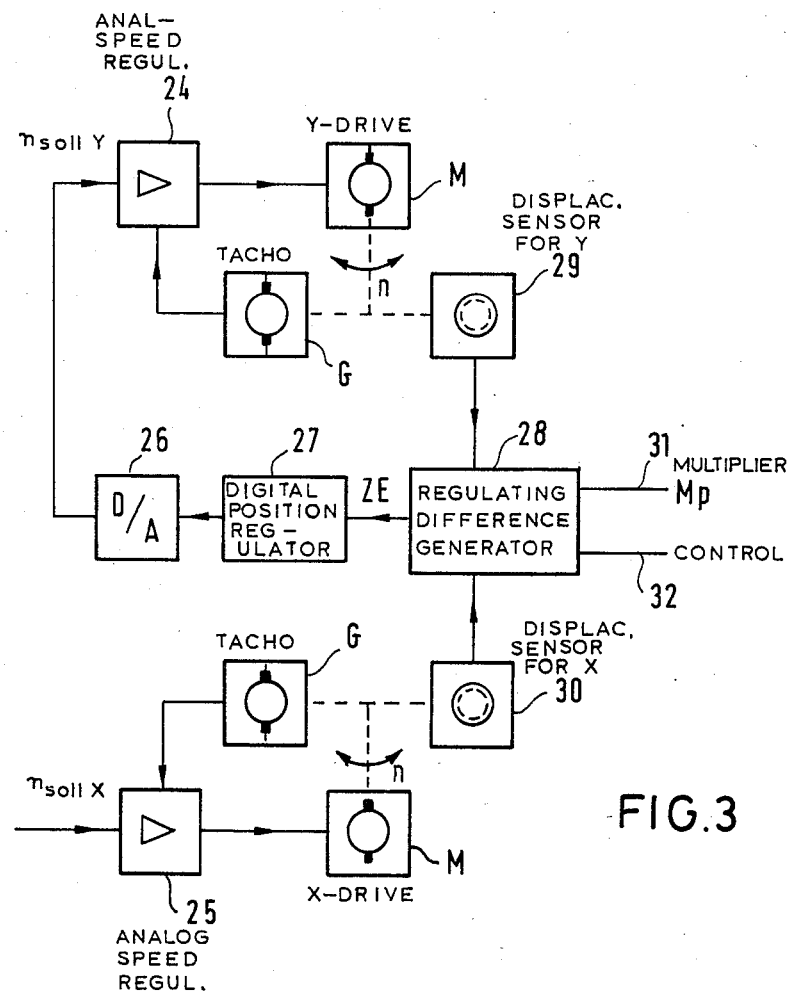
FIG. 3 is a block diagram of an exemplary application of the device of this invention.

FIG. 3 illustrates by way of an example the application of the device of this invention. In this embodiment, there are employed two D.C. drives M whose rotary movement is subject to linear regulation of this invention. For this purpose there are provided two incremental sensors 29, 30 which supply the regulating difference generator 28 with pulses $S_x$ and $S_y$ from which the regulating difference is generated. The regulating difference generator 28 is supplied at its input 31 with a pulse multiplying signal $M_p$ to produce from the above pulses $S_x$ and $S_y$ the counting result ZE in the manner as described in connection with the device of FIG. 1. The counting result ZE is applied to a digital position regulator 27 which produces nominal value $n_{solly}$. These y-rotary speed desired or nominal values of y-rotary speed are then applied via a D/A-converter 26 to an analog y-rotary speed regulator 24. The desired x-rotary speed values $n_{sollx}$ of the guiding axis are supplied directly to an analog x-rotary speed regulator 25, so that the nominal or desired x-rotary speed values $n_{sollx}$ determine actual rotary speed of both direct-current electric drives or motors M. The counting results correspond to the aforedescribed equations 10-13. From FIG. 3 it is evident that each of the rotary speed regulators 24 and 25 is provided with a tacho generator G. It will also be noted that control signals are applied to the regulating difference generator 28 via a conduit 32.

The present invention is not limited to the aforedescribed embodiments and may also find a useful application in other types of constructions differing from the types described above, according to the desired field of application. In general, the invention is applicable in all constructions where a linear motion regulation between two axes is required, that is where a differential can be created. The fields of application of this invention are, for example, gear-cutting technology, grinding technology, or gear measurement. Moreover, the invention is also applicable to motion regulation in measuring technology for providing correction values. The latter application is advantageous for example in the case where, for the measuring purposes, the axes are to be moved according to a linear function with such a high accuracy which cannot be achieved by conventional regulating means. By means of this invention it is possible to determine such a correction value which can be included in the computation of the measured value. Furthermore, the invention is not limited to the regulation of two axes, but it is suitable also for regulating a greater number of axes in dependence on a master axis, or vice versa for regulating one axis in dependence on several axes.

Figure 4:
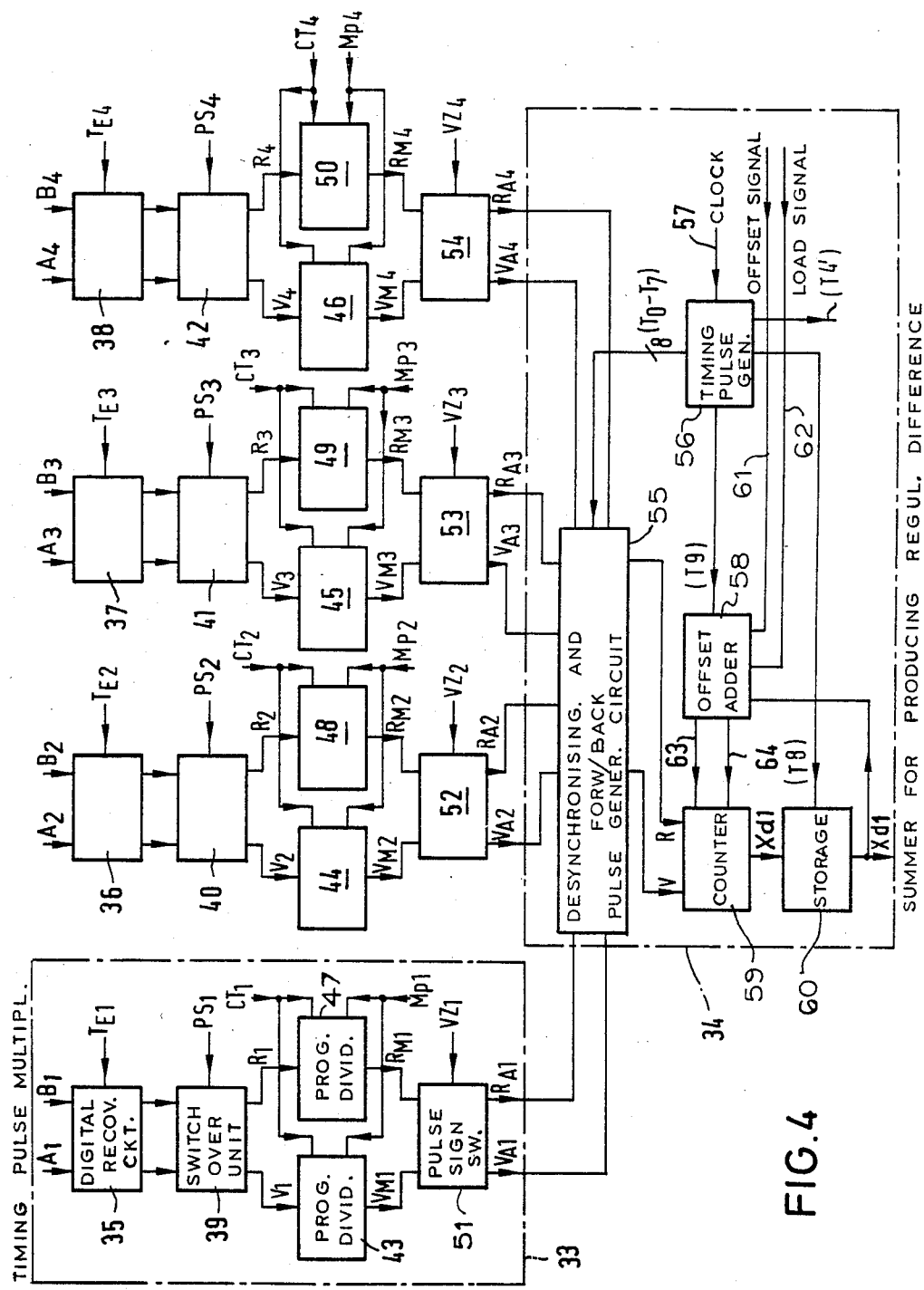
FIG. 4 is another embodiment of the device of this invention for regulating the linear movements of a component part along a plurality of axes.

FIG. 4 shows a block circuit diagram of another embodiment of this invention, namely for a linear motion regulation of an axis in dependence on one to three axis. The overall circuit consists essentially of four similar timing pulse multipliers 33 arranged side-by-side. For the sake of simplicity only one of these devices 33 has been delimited by a dash-dot line. A summer 34 for generating the regulating difference has its inputs connected to each of the timing pulse multipliers 31 and delivers at its output the regulating difference $x_{d1}$.

Each of the axes whose linear motion is to be regulated (total of four axes in FIG. 4) cooperates with a non-illustrated incremental actual displacement sensor which delivers respectively two-phase timing pulses A1, B1, A2, B2, A3, B3, A4, B4. These pairs of phase-shifted pulses are processed in digital recovery unit 35 to remove any interferences. Similarly as in the example of FIG. 1, the digital recovery units 35-38 include shift registers and corresponding additional logic circuits. The digital recovery units 35-38 are supplied with restoring pulses $T_{E1}$, $T_{E2}$, $T_{E3}$ and $T_{E4}$. The restored timing pulses at the output of each of the units 35-38 are processed in units 39-42 into a leading or forward pulses $V_1$ to $V_4$ and into trailing or backward pulses $R_1$ to $R_4$. For this purpose, switchover or blocking pulses $PS_1$, $PS_2$, $PS_3$ and $PS_4$ are applied to the control input of the switchover units 39. The resulting forward pulses $V_1$ to $V_4$ and backward pulses $R_1$ to $R_4$ are subsequently applied to the programmable dividers 43-46 or 47-50 and are multiplied by pulse multipliers $M_{p1}$ to $M_{p4}$. The resulting subdivided timing pulses $V_{M1}$ to $V_{M4}$ and $R_{M1}$ to $R_{M4}$ are applied to respective units or modules 51-54 where the switchover of the sign of these pulses is performed.

The sign switchover is made as follows:

sign pulse multiplier $VZ_x = 0$ $$V_{Ax} = V_{Mx}$$

$$R_{Ax} = R_{Mx}$$

sign pulse multiplier $VZ_x = 1$:

$$V_{Ax} = R_{Mx}$$

$$R_{Ax} = V_{Mx}$$

Hence, the pulses $V_{Ax}$, $R_{Ax}$ are the time pulses $V_x$, $R_x$ multiplied by $M_{px}$ and including sign information. The control inputs of sign switches 51-54 are supplied with sign multiplication signals $VZ_1$ to $VZ_4$. The programmable dividers 43-50 have their control inputs supplied with multiplying signals $M_{p1}$ and with clear signals $CT_1$ to $CT_4$.

The forward or leading pulses $V_{A1}$ to $V_{A4}$ and the backward or trailing pulses $R_{A1}$ to $R_{A4}$ at the outputs of sign switches 51-54 are applied to the common summer 34 where the sum or regulation difference is generated. The summer 34 includes the module 55 for desynchronization and pulse generation, to which the outputs of all timing pulse multipliers are connected. The incoming timing pulses $V_{A1}$ to $V_{A4}$ or $R_{A1}$ to $R_{A4}$ are compared with eight phase-shifted clock pulses $T_0$ to $T_7$ and unified into forward pulses V and backward pulses R. The forward pulses V and the backward pulses R are supplied to counting inputs of a forward-backward counter 59, the latter being also provided with a loading input 63 and a signal input 64 connected via a module 58 for an offset addition to a module 56 for generating timing pulses. Reference numeral 57 indicates an input for control pulses for the clock pulse generator 56, and reference numerals 61 and 62 indicate, respectively, inputs for an offset signal and a load signal applied to the offset adder 58. The output of the counter 59 is connected to a storage unit 60.

In counter 59, when disregarding the offset addition, the following sum is generated:

$$\begin{aligned} S = &\pm ([M_{p1}\Sigma PV_1] - [M_{p1}\Sigma PR_1]) \pm \text{(Equation 14)} \\ &\pm ([M_{p2}\Sigma PV_2] - [M_{p2}\Sigma PR_2]) \pm \text{(Equation 14)} \\ &\pm ([M_{p3}\Sigma PV_3] - [M_{p3}\Sigma PR_3]) \pm \text{(Equation 14)} \\ &\pm ([M_{p4}\Sigma PV_4] - [M_{p4}\Sigma PR_4]) \quad \text{(Equation 14)} \end{aligned}$$

In Equation 14

$PV_1$, $PV_2$, $PV_3$, $PV_4$ are forward pulses for the four axes;

$PR_1$, $PR_2$, $PR_3$, $PR_4$ are backward pulses for the four axes;

[m] denotes the largest integer $\leq m$ or the smallest interger $\geq m$; and $M_{p1}$, $M_{p2}$, $M_{p3}$, $M_{p4}$ are pulse multipliers.

The clock pulse generator 56 delivers 10 phase-shifted consecutive pulses $T_0$-$T_9$ and a regulating pulse $T_4'$ which in a subsequent digital regulator can serve as a scanning clock pulse.

By means of the offset addition in module 58 it is made possible to add to the computation result of the counter an offset without losing pulses; in this manner a relative position regulation on the guided drive is performed. The loading of the result of the addition is executed by the pulse $T_9$.

The device according to this embodiment of the invention enables to regulate an axis in dependence on the three additional axes according to the equations:

$$S_1 = M_2 S_2 \qquad \text{(Equation 15)}$$

$$S_1 = M_2 S_2 + M_3 S_3 \qquad \text{(Equation 16)}$$

$$S_1 = M_2 S_2 + M_3 S_3 + M_4 S_4 \qquad \text{(Equation 17)}$$

$S_2$, $S_3$ and $S_4$ are displacements predetermined for the three additional axes. $M_2$, $M_3$ and $M_4$ are real constants determined by the particular motion to be regulated.

In counter 59 a regulating difference $x_{d1}$ according to Equation 14 is determined, whereby the pulse multiplier $M_{px} \leq 1$ is selected such that one of Equations 15, 16 or 17 is fulfilled. This regulating difference $x_{d1}$ can be applied directly to a digital position regulator for the axis in question.

While the invention has been illustrated and described as embodied in specific examples of linear motion regulators, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A device regulating linear motion of a driven component part, particularly of a driven part of a machine tool moving along at least two correlated axes x and y of which one is a guiding axis and the other a guided axis, comprising
   at least two drive units for displacing the driven part along respective axes, one of said drive units being a master drive and the other a follower drive;
   displacement sensors coupled to said drive units for delivering timing signals corresponding to an actual displacement of said component part along said axes;
   a regulating difference generator including a counter coupled to said displacement sensors to determine from the timing signals a regulating difference signal from which a proper sign is determined;
   a position regulator connected between said counter and said drive units to regulate the follower drive in response to motions of said master drive;
   said displacement sensors being incremental motion sensors coupled to respective axes and each delivering a pair of phase-shifted timing signals; means for digital restoration of said phase-shifted timing signals, said restoration means including a shift register for determining recovery time and logic circuits for eliminating interfering pulses whose duration is smaller than the recovery time; a fast/slow pulse rate switching means having a control input for receiving a control signal, timing signal inputs connected via said restoring means to the displacement sensors, and outputs for delivering in response to the control signal fast or slow output signals; means for generating fast forward/backward pulses connected to the fast outputs of said switching means; means for generating slow forward/backward pulses connected to the slow outputs of said switching means; said switching means being controlled so that when a ratio $M_{p1}$ between the timing pulses of the guided and guiding axes is less than one the timing pulses of the guiding axis are applied to said means for generation of fast forward/backward pulses and the timing pulses of the guided axis are applied to said means for generating slow forward/backward pulses, and in the case of that ratio $M_{p1}$ between the timing pulses of the guided and guiding axis is greater than one, the timing pulses of the guiding axis are applied to said means for generating slow forward and backward pulses and the timing pulses of the guided axis are applied to said means for generating fast forward and backward pulses.

2. A device as defined in claim 1, wherein said means for generating slow or fast forward/backward pulses include monostable multivibrators for splitting the pairs of phase-shifted timing signals into forward pulses $V_s$, $V_l$ and backward pulses $R_s$, $R_l$.

3. A device as defined in claim 1, further comprising a switchover device for switching over said forward/backward pulses, said switchover device having two pairs of inputs, two pairs of outputs and a control input, said means for generating the slow forward/backward pulses having outputs directly connected to a pair of inputs of said switchover device, and said means for generating the fast forward/backward pulses being connected to the other pair of inputs of the switchover device via programmable dividers.

4. A device as defined in claim 3, wherein said means for generating slow or fast forward/backward pulses include control inputs for receiving switching pulses which alternately suppress the generation of slow forward/backward pulses while releasing the generation of fast forward/backward pulses and vice versa.

5. A device as defined in claim 4, wherein the programmable dividers include cascaded digital modules each having an input for receiving a pulse multiplying signal $M_p$.

6. A device as defined in claim 5, wherein said switchover device for switching over said forward/backward pulses includes a data selecting input connected to the control input of the fast/slow pulse rate switching means so that the control signal applied to the control input switches over the timing pulses $V_{sM}$, $R_{sM}$ from the outputs of the programmable dividers, and the timing pulses $V_1$, $R_1$ from the output of the means for generating the slow forward/backward pulses are switched over in such a manner that the timing pulses of the guiding axis are fed to the outputs $V_f$, $R_f$ and the timing pulses of the guided axis are fed to the outputs $V_g$, $R_g$ of the switchover device.

7. A device as defined in claim 6, further comprising two desynchronizing circuits each having two inputs, two outputs and a control input, the inputs of one desynchronizing circuit being connected to the $V_f$, $R_f$ outputs of the switchover device and the inputs of the other desynchronizing circuit being connected to the $V_g$, $R_g$ outputs of the switchover device; and a clock pulse generator having outputs connected to respective control inputs of said desynchronizing circuits.

8. A device as defined in claim 7, wherein said desynchronizing circuits include D-flip-flops controlled by the flanks of phase-shifted clock pulses $T_1$, $T_2$ from the outputs of said clock pulse generator.

9. A device regulating linear motion of a driven component part, particularly of a driven part of a machine tool moving along at least two correlated axes x and y of which one is a guiding axis and the other a guided axis, comprising
- at least two drive units for displacing the driven part along respective axes, one of said drive units being a master drive and the other a follower drive;
- displacement sensors coupled to said drive units for delivering timing signals corresponding to an actual displacement of said component parts along said axes;
- a regulating difference generator including a counter coupled to said displacement sensors to determine from the timing signals a regulating difference signal from which a proper sign is determined;
- a position regulator connected between said counter and said drive units to regulate the follower drive in response to motions of said master drive;
- said displacement sensors being incremental motion sensors coupled to respective axes and each delivering a pair of phase-shifted timing signals; means for digital restoration of said phase-shifted timing signals, said restoration means including a shift register for determining recovery time and logic circuits for eliminating interfering pulses whose duration is smaller than the recovery time;
- a fast/slow pulse rate switching means having a control input for receiving a control signal, timing signal inputs connected via said restoring means to the displacement sensors and outputs for delivering in response to the control signal fast or slow output signals; means for generating fast forward/backward pulses connected to the fast outputs of said switching means; means for generating slow forward/backward pulses connected to the slow outputs of said switching means; said switching means being controlled so that when a ratio $M_{p1}$ between the timing pulses of the guided and guiding axes is less than one the timing pulses of the guiding axis are applied to said means for generating fast forward/backward pulses and the timing pulses of the guided axis are applied to said means for generating slow forward/backward pulses, and in the case of that ratio $M_{p1}$ between the timing pulses of the guided and guiding axes is greater than one, the timing pulses of the guiding axis are applied to said means for generating slow forward and backward pulses and the timing pulses of the guided axis are applied to said means for generating fast forward and backward pulses;
- said means for generating slow or fast forward/backward pulses including monostable multivibrators for splitting said pairs of phase-shifted timing signals into forward pulses $V_s$, $V_1$ and backward pulses $R_s$, $R_1$;
- a switchover device for switching over said forward/backward pulses, said switchover device having two pairs of inputs, two pairs of outputs and a control input; said means for generating the slow forward/backward pulses having outputs directly connected to a pair of inputs of said switchover device; said means for generating the fast forward/backward pulses being connected to the other pair of inputs of the switchover device via programmable dividers;
- said means for generating slow or fast forward/backward pulses including control inputs for receiving switching pulses which alternately suppress the generation of slow forward/backward pulses while releasing the generation of fast forward/backward pulses and vice versa;
- the programmable dividers including cascaded digital modules each having an input for receiving a pulse multiplying signal $M_p$;
- said switchover device for switching over said forward/backward pulses including a data selecting input connected to the control input of the fast/slow pulse rate switching means so that the control signal applied to the control input switches over the timing pulses $V_{sM}$, $R_{sM}$ from the outputs of the programmable dividers, and the timing pulses $V_1$, $R_1$ from the output of the means for generating the slow forward/backward pulses are switched over in such a manner that the timing pulses of the guiding axis are fed to the outputs $V_f$, $R_f$ and the timing pulses of the guided axis are fed to the outputs $V_g$, $R_g$ of the switchover device;
- two desynchronizing circuits each having two inputs, two outputs and a control input, the inputs of one desynchronizing circuit being connected to the $V_f$, $R_f$ outputs of the switchover device and the inputs of the other desynchronizing circuit being connected to the $V_g$, $R_g$ outputs of the switchover device; and a clock pulse generator having outputs connected to respective control inputs of said desynchronizing circuits;
- said desynchronizing circuits including D-flip-flops controlled by the flanks of phase-shifted clock pulses from the outputs of said clock pulse generator;
- a timing pulse switching circuit having two pairs of inputs each connected to an assigned pair of outputs of respective desynchronization circuits, a control input connected to assigned pulse multiplier, and two outputs for delivering forward and backward timing pulses; and said counter being a forward/backward counter having its inputs connected to the outputs of said timing pulse switching circuit.

10. A device regulating linear motion of a driven component part, particularly of a driven part of a machine tool moving along at least two correlated axes x and y of which one is a guiding axis and the other a guided axis, comprising
- at least two drive units for displacing the driven part along respective axes, one of said drive units being a master drive and the other a follower drive;
- displacement sensors coupled to said drive units for delivering timing signals corresponding to an actual displacement of said component part along said axes;
- a regulating difference generator including a counter coupled to said displacement sensors to determine from the timing signals a regulating difference signal from which a proper sign is determined;

a position regulator connected between said counter and said drive units to regulate the follower drive in response to motions of said master drive;

said displacement sensors are incremental displacement sensors delivering phase-shifted timing pulses to said regulating difference generator, said regulating difference generator having a first control input connected to a pulse multiplier and a second control input connected to control signals, and the output of the regulating difference generator being connected to said position regulator which generates a digital y-axis regulating signal $n_{solly}$, said drive units being rotary drives rotating respectively about said axes x and y, the y-axis regulating signal from the output of a digital position regulator being applied via a D/A converter and an analog y-rotary speed regulator to a follower drive unit rotating about the y-axis whereby a desired rotary speed value for the x-axis is directly applied via an analog x-rotary speed regulator to the master drive unit rotating about the x-axis and being coupled via the second incremental displacement sensor to said regulating difference generator.

11. A device regulating linear motion of a driven component part, particularly of a driven part of a machine tool moving along at least two correlated axes x and y of which one is a guiding axis and the other a guided axis, comprising a master drive unit and a plurality of follower drive units, each drive unit cooperating with an actual displacement sensor each delivering a pair of phase-shifted timing pulses defining the actual displacement of said component part along or about the assigned axes;

a common regulating difference generator including a counter coupled to said actual displacement sensors to determine from the timing signals a regulating difference signal from which a proper sign is determined;

a position regulator connected between said counter and said drive units to regulate the follower drive units in response to motions of said master drive unit; a plurality of timing pulse multipliers connected to assigned actual displacement sensors, each timing pulse multiplier including a digital recovery unit, a switchover unit, a pair of grogrammable dividers and a pulse sign switch for separating said timing pulses into forward and backward pulses and for multiplying the separated pulses by factors $M_{p1}$ through $M_{pn}$ which upon switching over in the pulse sign switch are delivered to said common regulating difference generator, said regulating difference generator having the form of a summer connected to respective timing pulse multipliers for delivering at an output of the summer the regulating difference signal.

12. A device as defined in claim 11, wherein said summer includes a desynchronizing unit connected to the output of each timing pulse multiplier and having a control input connected to a timing pulse generator to produce from the input signals forward and backward timing pulses V and R, a forward/backward counter connected to the output of the desynchronizing unit to produce at its output a regulating difference signal $x_{d1}$ to be applied to said position regulator, said summer further including an offset adder controlled by said timing pulse generator and being connected to control inputs of said counter to form an offset adding signal.

* * * * *